H. BREWSTER.
LICENSE PLATE HOLDER.
APPLICATION FILED JAN. 31, 1921.
1,383,978.
Patented July 5, 1921.
2 SHEETS—SHEET 1.
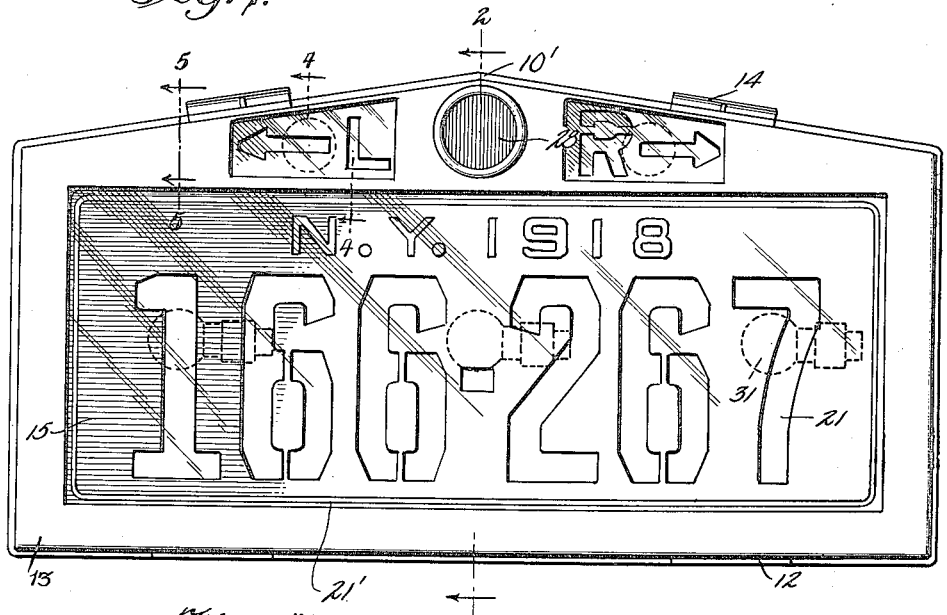
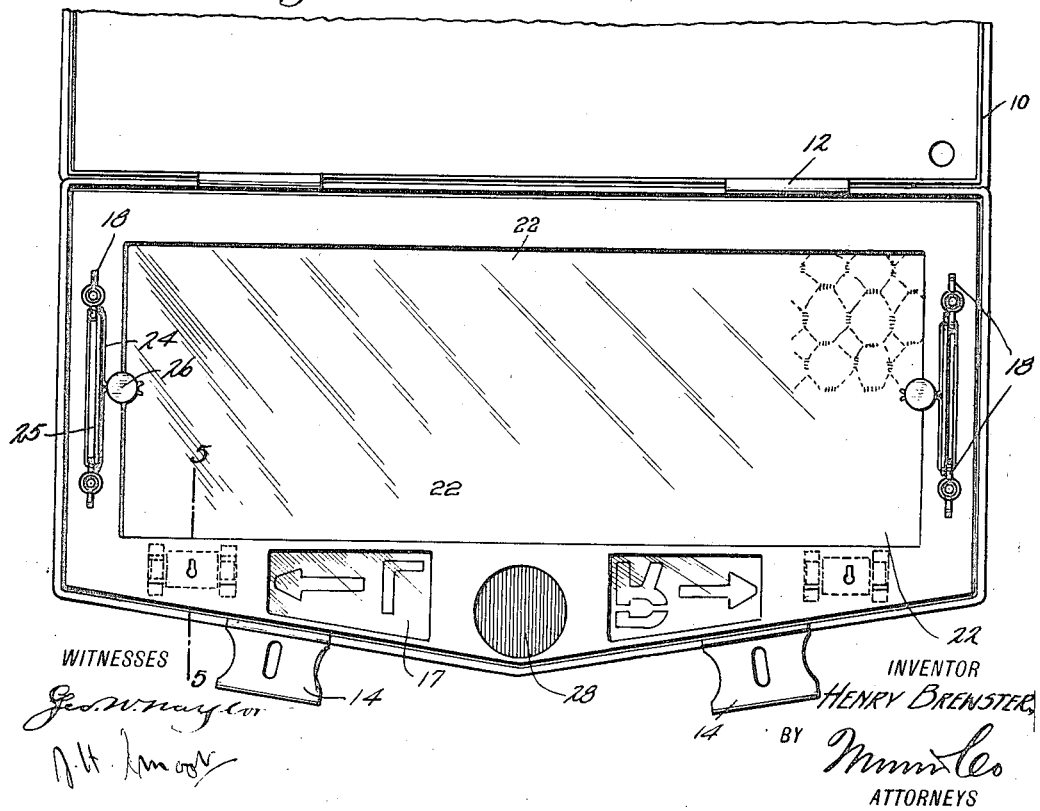
WITNESSES
INVENTOR
HENRY BREWSTER
BY
ATTORNEYS H. BREWSTER.
LICENSE PLATE HOLDER.
APPLICATION FILED JAN. 31, 1921.
1,383,978. Patented July 5, 1921.
2 SHEETS—SHEET 2.
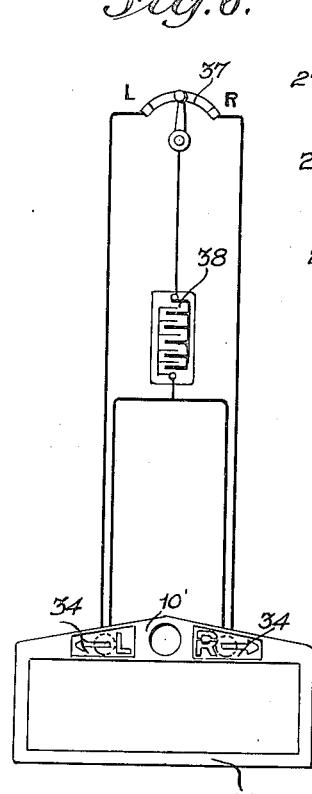
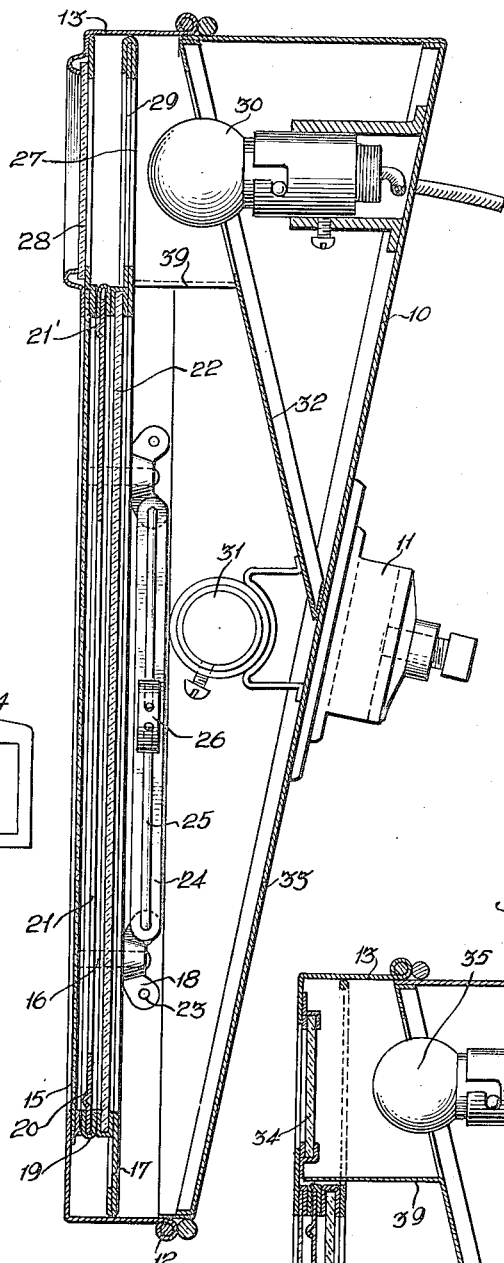
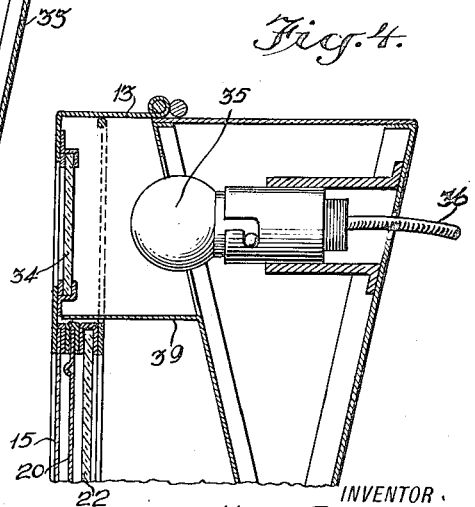
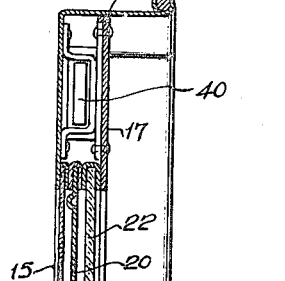
INVENTOR
HENRY BREWSTER
BY
ATTORNEYS

UNITED STATES PATENT OFFICE.

HENRY BREWSTER, OF NEW YORK, N. Y.

LICENSE-PLATE HOLDER.

1,383,978.  Specification of Letters Patent.  Patented July 5, 1921.

Application filed January 31, 1921. Serial No. 441,427.

*To all whom it may concern:*

Be it known that I, HENRY BREWSTER, a citizen of the United States, and resident of the city of New York, borough of Manhattan, county and State of New York, have invented a new and Improved License-Plate Holder, of which the following is a full, clear, and exact description.

This invention relates to a plate holder, and more particularly to that type of plate which is conventionally known as a license plate, positioned upon the rear parts of automobiles, and aims to provide certain improvements over my prior Patent #1,219,236.

It is well appreciated that license plates have left much to be desired, in that the same quickly become soiled, which renders it very difficult to read the numbers upon the plate in the event of a motor meeting with an accident and speeding away. This is particularly true at night, it being appreciated that the conventional license plate is illuminated by merely one bulb upon and to one side of the plate. By virtue of the fact that the numerals are usually embossed upon the plate, shadows are thrown by these numerals which renders a quick reading of the plate at night almost impossible, particularly when the machine on which they are positioned is running at a high rate of speed and constantly vibrating the plate.

Another defect which has been found in connection with license plates is that upon an automobile being stolen it is a very simple matter for a thief to remove the plate applied to the same and substitute in lieu thereof a second plate bearing a different number, and by virtue of the great number of machines of any type employed in a large city it is almost impossible for an officer of the law or owner of a machine to recognize any stolen machine.

For this reason inspection of garages has been restored to where the manufacturer's number and chassis numbers have been examined, but it is appreciated that it is a very simple operation to so alter these numbers that they bear no resemblance to the original number marked upon the motor and chassis.

Now with a view of eliminating these defects and constructing a plate holder of an improved construction over the plate holder shown in my prior patent above referred to, I have constructed such a device by means of which the license plate may readily be read after dusk.

A further object of my invention consists in providing a plate holder in which a plate may be so positioned that it may be sealed so as to prevent unauthorized removal and it will consequently be an easy matter for an officer of the law to merely examine the seals preventing a removal of the plate, and to investigate those machines the plate seals of which have been tampered with or removed.

A still further object of my invention is the construction of a device of this nature which will also serve to indicate the direction in which the vehicle is about to turn so that accidents in this connection will be reduced to a minimum.

Reference is had to the attached sheets of drawings as illustrating one practical embodiment of my invention, and in which—

Figure 1 is a face view of a plate holder constructed in accordance with my invention.

Fig. 2 is an enlarged sectional side view taken on the line 2—2 of Fig. 1.

Fig. 3 is an enlarged view showing the same open.

Fig. 4 is an enlarged sectional view taken along the lines 4—4 of Fig. 1, and

Fig. 5 is an enlarged sectional view taken on the line 5—5 of Fig. 1, and

Fig. 6 is a somewhat diagrammatic view illustrating the circuit employed in connection with the signaling apparatus.

In all of these views like reference numbers designate similar parts, and the reference numeral 10 indicates a housing preferably formed with a peaked upper surface as indicated at 10'. Associated with the rear wall of the housing 10 is any suitable means 11 which serves to attach the same to the rear of the vehicle. The housing is formed with an open front face, and a cover serves to normally close this face, such cover conforming to the outline of the housing 10 and being indicated by the reference numeral 13.

With a view of providing means permitting partial detachment of the cover from the housing so that access may be had to the interior of the same, I provide any suitable connecting means such as a hinge 12 serving to movably support the cover 13 with respect to the housing 10, fasteners such as 14 being provided to normally retain the cover in closed position.

The cover is formed with a preferably rectangular opening which is closed by any suitable translucent means, such as a sheet of mica 15, secured to the cover adjacent the side edges of said opening. Projecting inwardly from the face of the cover 13 are screw threaded lugs such as 16, which lugs are firmly secured to the cover and serve a purpose hereinafter more fully specified.

A plate holder including a backing plate 17 and conforming to the interior of the cover 13 is formed with openings through which the lugs 16 are adapted to project, and the plate is applied to the lugs in this manner, and is firmly secured in this position by means of winged nuts 18 engaging the lugs 16 and serving to clamp the backing plate 17 between the inner face of the cover 13 and the winged nuts 18.

With a view of removably mounting the license plate within this holder, and to provide a construction permitting the same to be readily recognized, the plate holder is formed with a cut-out portion substantially in line with the cut-out portion of the cover 13, and adjacent this cut-out portion the longitudinal inner edges of the plate holder are formed with grooves such as 19, the outermost of which is adapted to receive a plate such as 20 formed with cut-out identification portions 21, and a conventional bead 21' extending parallel to the edges of the same, which bead serves to coöperate with the upper edges of the side walls of the grooves 19 to permit of an easy sliding of the plate within the same. The rearmost groove 19 slidably mounts a wire-reinforced translucent plate as has been indicated at 22 in Fig. 3, and it will readily be appreciated that a source of light within the housing 10 will illuminate the translucent plate, certain portions of such plate being invisible by virtue of the license plate 20 thus permitting the recognizing of this plate after dusk as well as during the day light by virtue of the contrasts between these two elements.

Now with a view of providing means which will permit of a ready sealing of the plate so as to render the same non-removable from the cover without such removal being readily perceptible, I form the winged nuts 18 with openings such as 23. A bar 24 of any suitable material is formed with openings adjacent these ends, such openings aline, when the bar is applied thereto, to the openings through the inwardly extending wings of the nuts 18. A wire or other suitable flexible member 25 is now threaded through the openings 23 and the alining openings in the bar 24, and the ends of this wire are brought together in any suitable seal such as 25, which is fixed at this point by an authorized official.

To now provide means complying with the required red tail light, I form the cover 13 with a second opening 27 which may be of any desired contour, and is conveniently located upon the rectangular opening in the cover and within the peaked portion of the cover conforming to the similar portion of the housing 10. Mounted adjacent this opening is a conventional translucent red plate 28 and that portion of the backing plate 17 in line with the opening 27 is also cut out as has been indicated by the reference numeral 29. A source of light, such as an electric bulb 30 being mounted upon the inner face of the rear wall of the housing 10 and within the peaked portion of the same provides illumination for the translucent plate 28.

It will be obvious that a suitable type of reflector must be provided for the source of light conveniently including a series of bulbs 31 which serve to illuminate the translucent plate 22 and having this in mind I provide within the housing 10 such a reflector which is constructed with a view of providing extreme compactness and simplicity. With this end in view a reflecting surface including an inclined plate 32 is mounted in the upper half portion of the housing 10 and extends at an angle to the rear wall of the housing 10, and between the upper outer edge of the same and the rear wall thereof to a point approximately intermediate the upper and lower edges of the same.

The rear wall of the housing 10 is, as will be noted in Fig. 2, arranged at an inclined plane throughout its entire length, so that a reflecting surface 33 is provided, which reflecting surface coöperates with a plate 32 to produce the finished reflector.

It will readily be appreciated that by this construction, an ideal reflector will have been provided which reflector will serve to evenly distribute light over the entire surface of the translucent plate 22. It will readily be seen from the foregoing that I have provided a plate holder by means of which the identification marks on the licence plate may readily be read during the day or after dusk, which plate holder and plate will however conform to all the requirements of the law, and by means of which it will be virtually impossible to tamper with a license plate without such tampering being readily detected.

It will also be noted, reference being had to Fig. 4, that the plate 17 is provided with further openings, one to each side of the opening 29. Any suitable translucent means 34 are provided within the openings thus formed to indicate the intention of the driver of the vehicle to turn. This indicating means may conveniently be in the nature of letters L and R, together with associated arrows to notify the direction in which the turn is to be made.

A source of illumination 35 provided for coacting with the translucent means 34 may have short lead wires 36 connected to a switch 37, and a source of current 38. Thus upon the operator operating the letters 37 by any desirable means, it will be obvious that the circuit will be closed to illuminate either of the elements 34, thus clearly signaling the driver of a following vehicle.

In this connection it is to be noted that the bulb 34 is conveniently provided with cooperating letters, preferably positioned adjacent the plate holder i. e. in the rear part of the vehicle so that it will be impossible for a driver meeting with an accident, to avoid identification by extinguishing the lights from the dash and proceeding, as is now often the case.

Also it will be seen that it would be desirable to provide means which would shade the translucent members 28 and 34 from the action of light rays connecting from the source of illumination 33, and with this in view, it will be noted that the plate 32 has portions out struck, as has been indicated by the reference numeral 39, which out struck portions conveniently act as shades to prevent light rays acting upon the translucent members above referred to.

To now finally provide means which will co-act with the wing nuts 18, etc., to prevent an unauthorized removal of the license plate, suitable locks 40 may be conveniently incorporated, which locks coöperate with the cover 13, as has been shown in Figs. 3 and 5, to further guard against removal of the plate holder.

While my invention has been described and shown as used in connection with an automobile license plate it may readily be appreciated that this invention might be adopted for any number of different uses, and that the construction herein described and shown might readily be varied in normal details without in the least departing from the scope of my claims.

What I claim as new and desire to secure by Letters Patent is as follows:—

1. A plate holder, including a housing formed with an open face, a source of light within said housing, a reflector for said source of light, said reflector including a plate arranged at an angle between the outer upper edge of said housing and the rear wall of the same, the rear of said housing below and adjacent to the point of contact of said plate with the same, being inclined outwardly to form a second reflecting surface.

2. A plate holder including a housing, a cover movably attached to said housing, and being adapted to close the open face of the same, lugs extending inwardly through said cover and adjacent the cut-out portion of the same, a plate holder including means adapted to retain a plate in position, and a cut-out portion in line with the cut-out portion of the cover, such plate being further formed with openings through which said lugs are adapted to project, winged nuts engaging said screw threaded lugs, and being adapted to clamp the plate holder between the same and inner face of the cover, the wings of said nuts being formed with openings, rods formed with openings adjacent their outer ends, and being capable of being alined with the openings in the wings of the nuts, and a wire adapted to be threaded through said openings and having its edges brought together and retained in this position by a seal.

HENRY BREWSTER.